United States Patent
Taggart et al.

[11] Patent Number: 5,821,428
[45] Date of Patent: Oct. 13, 1998

[54] SEALED OBSERVATION ELEMENT FOR SULFUR RECOVERY UNIT

[75] Inventors: George W. Taggart, Dallas; James E. Lewis, Plano; Craig S. Ward, Sachse, all of Tex.

[73] Assignee: Koch Enterprises, Inc., Wichita, Kans.

[21] Appl. No.: 502,787

[22] Filed: Aug. 11, 1995

[51] Int. Cl.[6] .................................................. G01F 23/02
[52] U.S. Cl. .................................. 73/861.56; 73/323
[58] Field of Search ............................. 73/323, 324, 325, 73/327, 334, 861.56, 215, 216

[56]  References Cited

U.S. PATENT DOCUMENTS

| | | | |
|---|---|---|---|
| 1,538,264 | 5/1925 | Albright | 73/323 |
| 2,998,724 | 9/1961 | Singleton | 73/323 |
| 3,200,644 | 8/1965 | Brous | 73/324 |
| 3,713,743 | 1/1973 | Simms | 356/208 |
| 3,786,901 | 1/1974 | Randell | 184/6.8 |
| 3,976,550 | 8/1976 | De Nora et al. | 204/98 |
| 4,206,537 | 6/1980 | Meginnis | 73/334 X |
| 4,888,990 | 12/1989 | Bryan et al. | 73/323 X |
| 4,893,912 | 1/1990 | Kohnen et al. | 73/324 X |
| 5,000,580 | 3/1991 | Leininger et al. | 374/130 |
| 5,266,274 | 11/1993 | Taggart et al. | 422/112 |
| 5,297,429 | 3/1994 | Brown et al. | 73/323 |

FOREIGN PATENT DOCUMENTS 513258  2/1921  France ..................................... 73/323

Primary Examiner—George M. Dombroske
Assistant Examiner—Paul D. Amrozowicz
Attorney, Agent, or Firm—Winstead Sechrest & Minick, P.C.; Gregory W. Carr

[57]  ABSTRACT

A sealed observation element for viewing the flow of molten liquid during the operation of a sulfur recovery unit comprises at least one sight glass that is heated and which may be swept with a purge gas supplied through one or more bleed rings to prevent condensation or deposition of materials on the side of the sight glass exposed to the process stream.

35 Claims, 4 Drawing Sheets

SEALED OBSERVATION ELEMENT FOR SULFUR RECOVERY UNIT

TECHNICAL FIELD

This invention relates to the control and operation of a sulfur recovery unit. More specifically, the invention relates to a sealed observation element which enables the operator of the sulfur recovery unit to monitor the flow of liquid sulfur at various locations in the unit.

BACKGROUND OF THE INVENTION

In the operation of a Claus-type sulfur recovery unit it is desirable, if not essential, for the operator to be able to visually monitor the flow of liquid sulfur at various locations in the unit. This is conventionally accomplished through the use of open overflow elements which allow the operator to observe the flow of liquid sulfur over weirs or seal pots which function at atmospheric pressure and rely on a liquid seal to isolate the process from the open observation element. The open overflow element is typically accessed by means of a hinged cover which allows the operator to visually observe the flow of liquid sulfur over a weir or seal pot and thus determine whether liquid sulfur is flowing from, for example, a sulfur condenser.

Open overflow elements may, however, be a source of fugitive emissions. Additionally, open overflow elements may represent a significant safety hazard as a potential source of hydrogen sulfide gas and molten sulfur in the event of an over pressurization of the system that blows the liquid sulfur out of the seal or seal pot. Furthermore, the design of conventional open overflow elements used in sulfur recovery units normally precludes designing the unit for higher, lower and in particular, variable pressures. Therefore, there exists a need for providing the operator of a conventional Claus-type sulfur recovery unit with means for monitoring liquid sulfur production that does not have the drawbacks inherent in conventional open overflow elements.

SUMMARY OF THE INVENTION

The present invention provides an apparatus comprising a sealed observation element for visually monitoring the flow of liquid sulfur in a sulfur recover unit without the release of fugitive emissions or the other disadvantages inherent in the use of conventional open overflow elements. The invention also allows the sulfur recovery unit to be operated at higher and more variable pressures than would be possible using conventional open overflow elements that operate at atmospheric pressure. Additionally, the invention provides greater protection of personnel and equipment in the event of an overpressurization of the unit. The sealed observation element of the present invention includes at least one heated sight glass for viewing the flow of molten liquid sulfur through a sulfur transfer line. The sight glass is heated and may be swept with a purge gas to prevent condensation or deposition of materials on the side of the sight glass exposed to the process stream. In one embodiment of the invention, a pair of sight glasses secured on either side of a bleed ring define an interior space that is heated with a heated gas, steam or an electrical heating element. Additionally, a weir and light source may be provided to direct and illuminate the flow of the molten stream. The sealed observation element may include a steam jacket pipe or pipe cross for mounting the sight glass at appropriate locations in a sulfur recovery unit and/or on a sulfur transfer line to enable an operator to view the flow of molten sulfur without the potential release of vapors to atmosphere. Since the sealed observation element of the present invention does not rely on a liquid seal which may be blown out in the event of an overpressurization of the unit, the sealed observation element may allow for operation of the unit at higher, lower, and more particularly at more variable pressures. Thus the sealed observation element of the present invention provides numerous advantages over conventional open observation elements.

BRIEF DESCRIPTION OF THE DRAWINGS

For a more complete understanding of the present invention and the advantages thereof, reference is now made to the following Detailed Description taken in conjunction with the accompanying Drawings in which.

DETAILED DESCRIPTION

Figure 1:
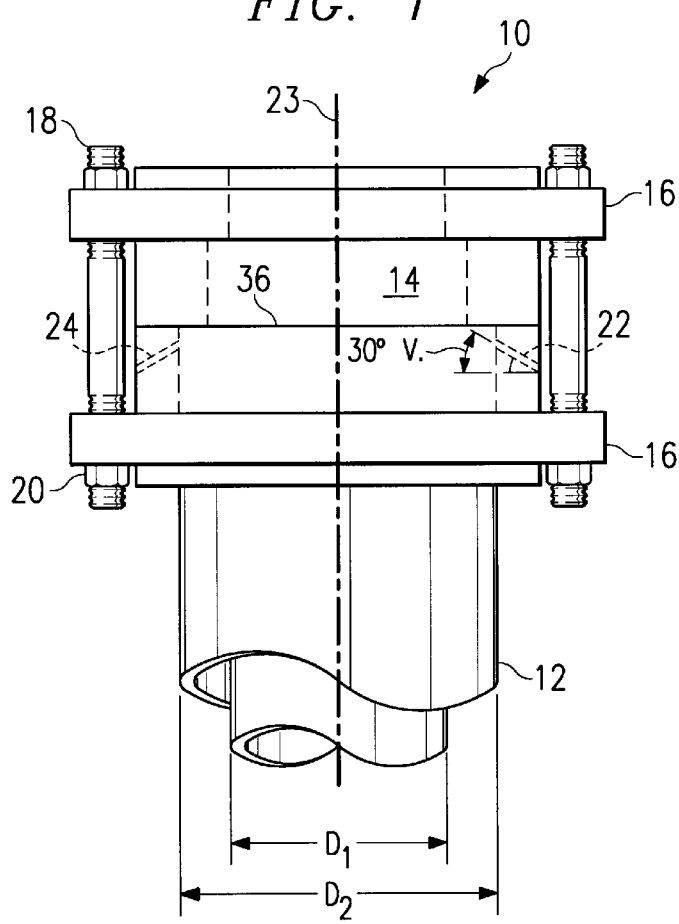
FIG. 1 is a partial side view of a sealed observation element of the present invention.
Figure 2:
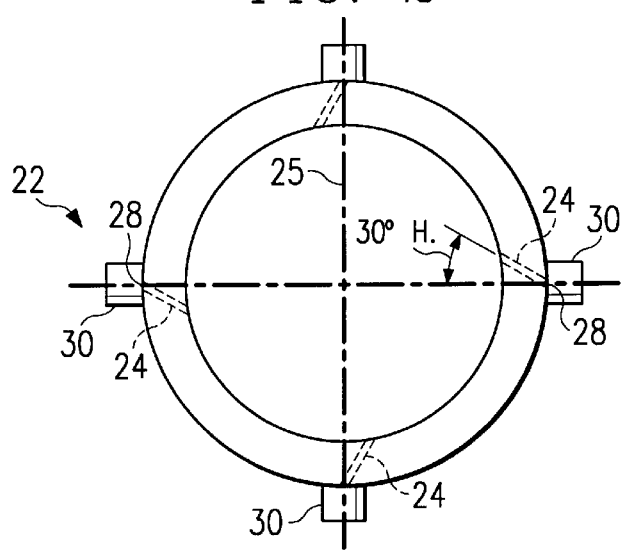
FIG. 2 is a cross section of the sealed observation element of FIG. 1.
Figure 3:
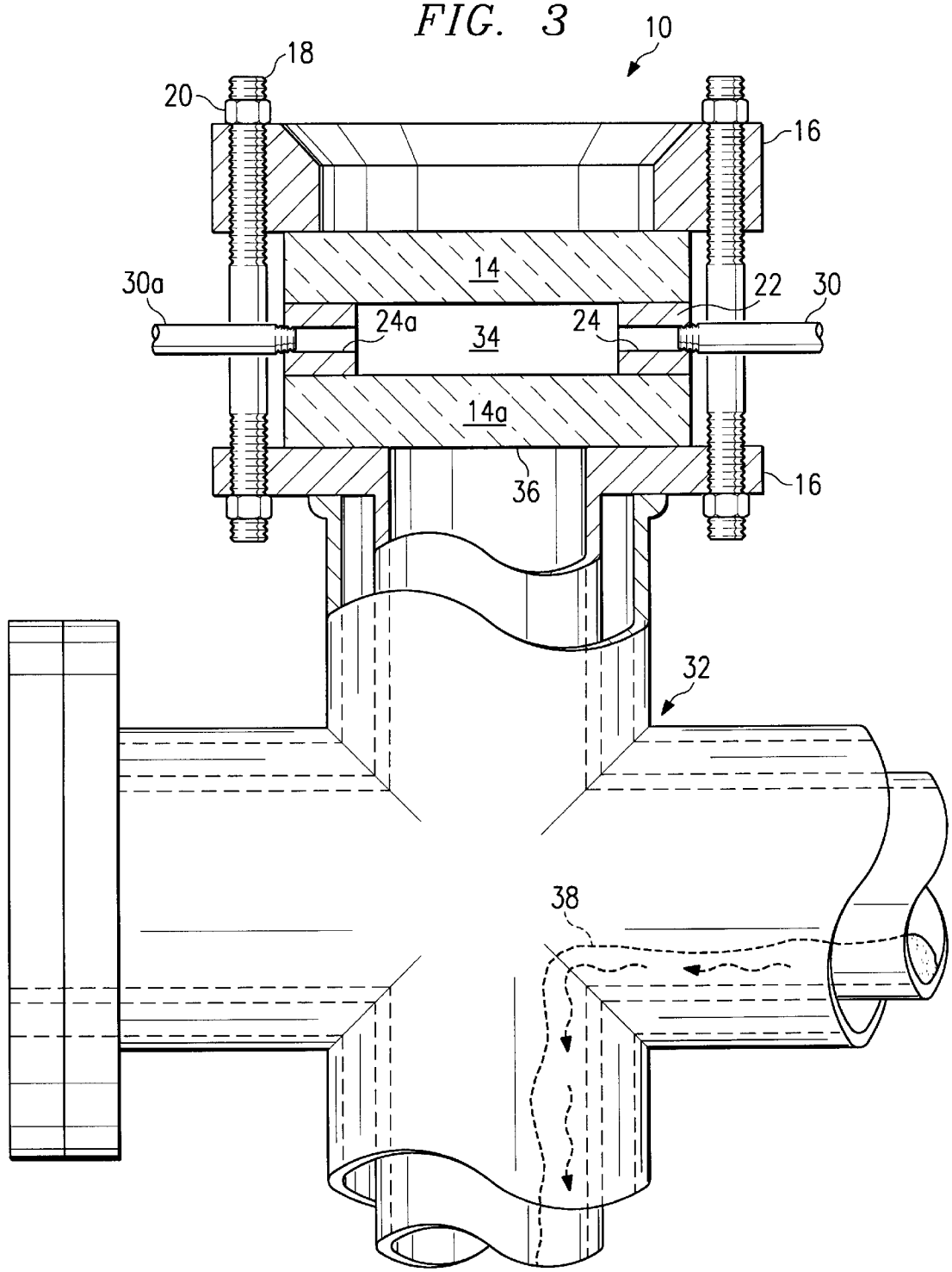
FIG. 3 a perspective view of an embodiment of the sealed observation element of the present invention including a steam jacketed pipe cross.

Referring now to the drawings where like reference characters designate like or similar parts throughout, and specifically to FIGS. 1, 2 and 3, a first embodiment of the sealed observation element 10 of the present invention is illustrated. Observation element 10 is mounted on a steam jacketed pipe 12 and includes a sight glass 14, preferably of the fused steel type. "Steam jacketed pipe" as used herein refers to a smaller pipe, for example a four inch diameter pipe secured inside a larger pipe, for example a six inch diameter pipe. Steam is injected into the space between the larger pipe and smaller pipe in order to heat the smaller pipe and prevent the solidification of the material flowing through the smaller pipe. Lines used to transfer molten sulfur, which has a melting point of approximately 235° F., are typically steam jacketed in order to prevent the molten sulfur from solidifying inside the pipe.

The sealed observation element 10 is secured to the end of jacketed pipe 12 with flanges 16 which may be of the slip-on type. Flanges 16 are bolted together with stud bolts 18 and nuts 20. As illustrated, the observation element 10 includes an annular bleed ring 22 having an annular axis 23. A plurality of passageways 24 extend through bleed ring 22 at locations around the circumference of the bleed ring. In the embodiment illustrated in FIGS. 1 and 2, four such passageways are located at 90° intervals around the circumference of the bleed ring 22.

As illustrated, each of the passageways 24 extends through the bleed ring 22 at an angle of approximately 30° relative to a plane taken perpendicular to an annular axis 23 of the bleed ring and toward sight glass 14. Each of the passageways 24 is also positioned at an angle of approximately 30° relative to a diameter 25 of the bleed ring 22 taken between opposed exterior openings 28 of passageways 24. Connectors 30 are provided to connect a source of purge gas (not shown) such as steam or preferably an inert gas such as nitrogen to the sealed observation element 10 at the passageway 24 in the bleed ring 22.

Due to the angle at which the passageways 24 are positioned, as described above, purge gas introduced through the passageways 24 tends to sweep against the interior surface 36 of the sight glass 14 preventing condensation of vapors or the deposition of materials that otherwise may condense or be deposited on the inside surface of the sight glass 14. The sweep gas may be introduced on an intermittent basis, in which case the sweep gas removes materials which have been deposited or have condensed on the interior surface 36 of the sight glass 14. The cross-sectional area of the passageways 24 required to permit sufficient flow of purge gas to keep the sight glass 14 clear may vary with the diameter of the sight glass 14, the system pressure, the supply pressure of the purge gas and the number of passageways provided. It is, however, believed that in a typical application in which a sight glass six inches in diameter is clamped onto the end of a steam jacketed pipe formed from a four inch diameter ($D_1$) pipe, inside a six inch ($D_2$) pipe, four passageways 24, one-eighth inch in diameter, located at 90° intervals around the circumference of the bleed ring 22 and angled as described above will be sufficient to keep the sight glass clear, assuming that the temperature and pressure of the purge medium is adequate. The sealed observation element of FIG. 1 may be positioned at locations within the sulfur recovery unit to enable the operator to view the flow of molten sulfur over a weir or from a seal pot. For example, sealed observation element 10 may be mounted in the top of a sulfur tank above an open weir to enable the operator of the sulfur recovery unit to observe the flow of molten sulfur over the weir without opening the tank to atmosphere.

An alternative embodiment of the sealed observation element of the present invention is illustrated in FIG. 3 which includes a steam jacketed pipe cross 32 which may be positioned in a liquid sulfur transfer line. Sealed observation element 10 includes two sight glasses 14 separated by bleed ring 22. The sight glasses 14 and bleed ring 22 are clamped onto a steam jacketed pipe cross 32 with flanges 16 which are secured with stud bolts 18 and nuts 20. As illustrated, upper and lower sight glasses 14 and 14a and bleed ring 22 define an interior space 34. Passageways 24 and 24a extend through the bleed ring 22 providing means for communication between connectors 30 and 30a and interior space 34.

A source of heating medium (not shown), for example, steam or heated inert gas, is introduced into interior space 34 through one or more of connectors 30 and passageways 24. The heating medium heats lower sight glass 14a to a temperature sufficient to prevent the condensation of vapors on the interior surface 36 of the lower sight glass 14a. Condensate or cooled gas exits interior space 34 through one or more passageways 24a and connectors 30a. Since the sight glass 14a is heated to a degree sufficient to prevent the condensation of vapors, especially sulfur vapors, it tends to remain clear during the operation of the unit. Thus, the operator of the sulfur recovery unit can view the flow of molten sulfur 38 through sight glasses 14 and 14a during the operation the sulfur recovery unit.

Optionally, a second bleed ring, of the type illustrated in FIG. 1 may be interposed between lower sight glass 14a and the steam jacketed pipe cross 32 to sweep the interior surface 36 of sight glass 14a with a purge medium such as steam or an inert gas.

Figure 3A:
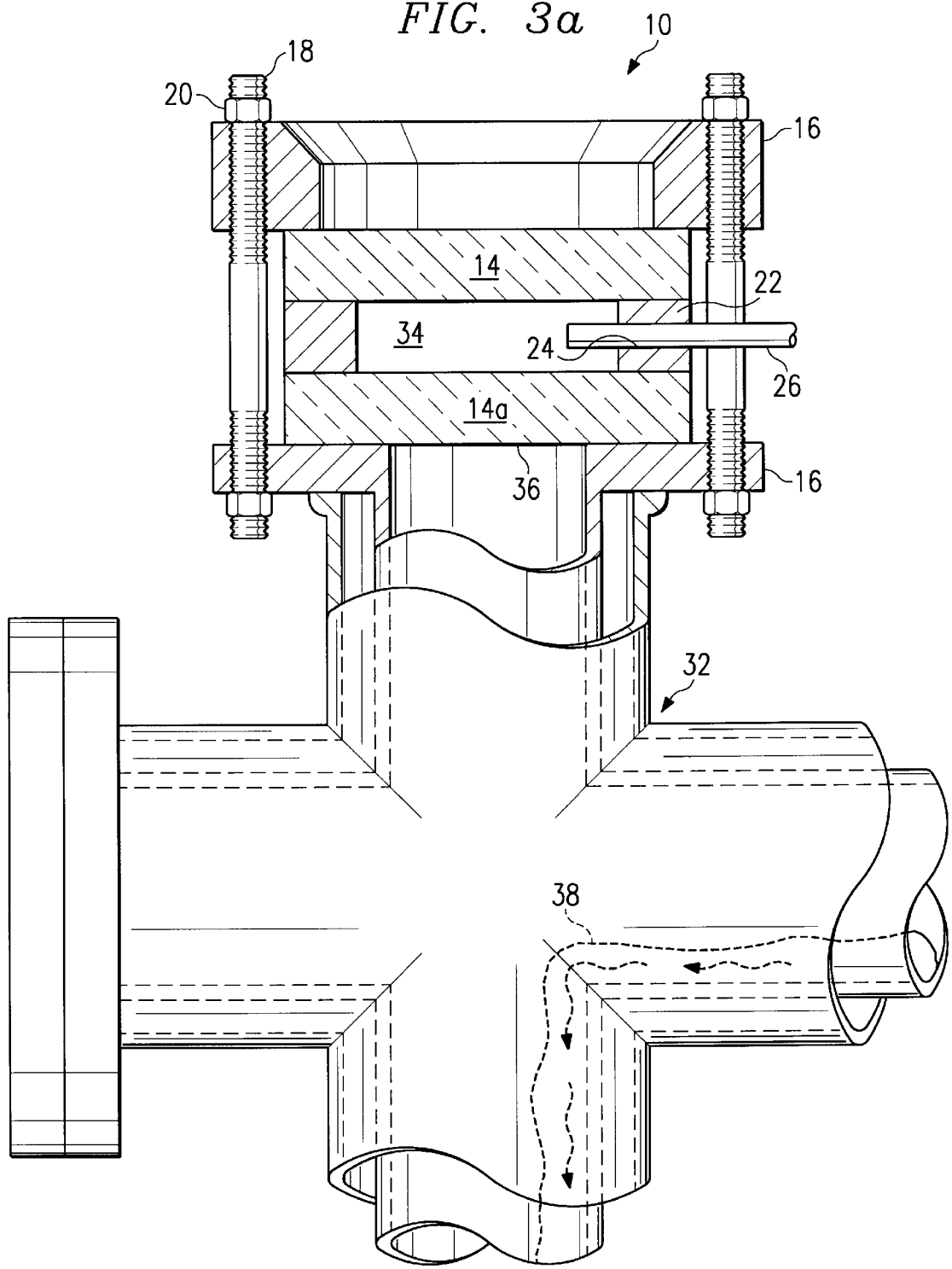
FIG. 3(a) is an alternate embodiment of the sealed observation element of FIG. 3.

As an alternative to the use of a gaseous heating element, an electrical heating element may be used to heat the interior space 34 as illustrated in FIG. 3(a). In this embodiment, a resistance heating element 26 is inserted through passageway 24 into the interior space 34 defined by upper sight glass 14, bleed ring 22 and lower sight glass 14a. The heating element 26 may also be laminated between the sight glass 14 and lower sight glass 14a thereby eliminating the need for bleed ring 22. Additionally, a second bleed ring, of the type illustrated in FIG. 1 may also be interposed between lower sight glass 14a and the steam jacketed pipe cross 32 to sweep the interior surface 36 with a purge medium such as an inert gas.

Figure 4:
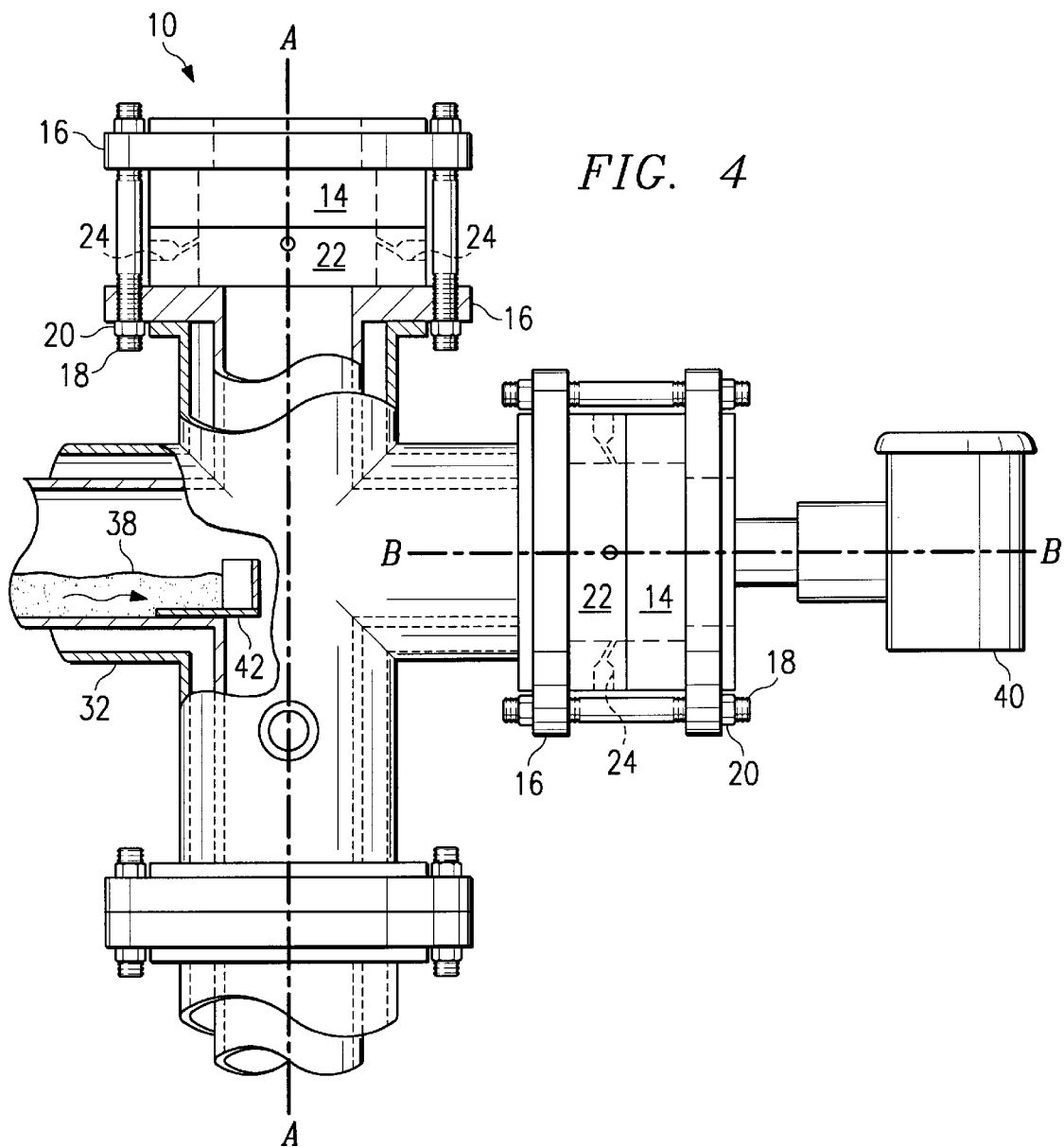
FIG. 4 is a perspective view of an embodiment of the sealed observation element of the present invention including additional components.
Figure 6:
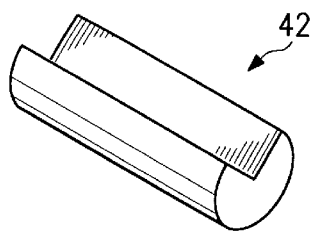
FIG. 6 is a perspective view of a weir employed in the sealed observation element of FIG. 4.
Figure 5:
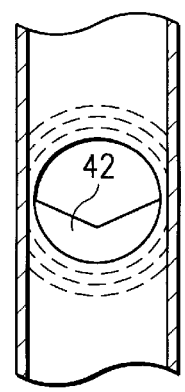
FIG. 5 is a cross sectional view along line A—A of FIG. 4.

Turning now to FIGS. 4, 5 and 6 a further embodiment of the sealed observation element of the present invention is illustrated. Sealed observation element 10, of the type illustrated in FIGS. 1 and 2, is mounted on steam jacketed pipe cross 32. Annular axis A—A passes through the center of bleed ring 22 along the line of sight of an operator looking through sight glass 14. In order to increase the visibility of the sulfur flow through the pipe cross, a light fixture 40 and weir 42 are provided. Light fixture 40, is clamped onto flange 16 with stud bolts 18 and nuts 20 to project a beam of light along axis B—B, which is substantially perpendicular to axis A—A. Weir 42 is positioned in the pipe cross opposite light fixture 40 and extends into the center area of the jacketed pipe cross 32. Thus, molten sulfur 38 flowing through the pipe cross, from, for example, a sulfur condenser, flows over weir 42 adjacent to the line of sight along axis A—A of an operator observing the flow. Additionally, the molten sulfur flowing over the weir is illuminated by a beam of light from light fixture 40 projected along axis B—B which is perpendicular to axis A—A and thus may be more readily observed under unfavorable lighting conditions.

Although the embodiment of the invention illustrated in FIG. 4 is shown using a single lens configuration with a bleed ring of the type described in connection with FIG. 1, the double lens configuration of FIGS. 3 or 3(a) could be substituted for the single lens configuration, depending upon the application. Additionally, the double lens configuration of FIGS. 3 or 3(a) could be provided with a second bleed ring, of the type illustrated in FIG. 1, interposed between lower sight glass 14a and the steam jacketed pipe cross 32 to sweep the interior surface 36 with a purge medium such as an inert gas.

While the present invention has been disclosed and discussed in connection with the foregoing embodiments, it will be understood that the invention is not limited to the embodiments disclosed, but is capable of numerous rearrangements, modifications, and substitutions of parts and elements without departing from the spirit and scope of the invention.

What is claimed is:

1. A sealed observation element for viewing the flow of material comprising:

a sight glass having an interior and an exterior surface;

a source of a heated purge medium, a bleed ring positioned adjacent to the sight glass, said bleed ring having an annular axis and defining at least a pair of purge passageways for the flow of said heated purge medium, said purge passageways on opposite sides of said bleed ring and angled to direct the flow of the heated purge medium toward the interior surface of said sight glass; and at least one connector for connecting the source of the purge medium to the passageways;

wherein said sight glass is positioned to permit a direct viewing of the flow of material.

2. The sealed observation element of claim 1 further comprising a steam jacketed pipe for mounting said sight glass and bleed ring.

3. The sealed observation element of claim 1, wherein the purge passageways are angled toward the interior surface of said sight glass at an angle of about 30° relative to the interior surface of the sight glass.

4. The sealed observation element of claim 2 wherein at least two pairs of opposed purge passageways are defined by the bleed ring, wherein the purge passageways are angled toward the interior surface of said sight glass at an angle of about 30° relative to said diameter.

5. The sealed observation element of claim 1 further comprising a pipe cross for mounting the sealed observation element in a material transfer line.

6. The sealed observation element of claim 5 further comprising
 a weir for directing the flow of material toward the center of the pipe cross; and
 a light source for illuminating the flow of material through the liquid transfer line, the light source projecting a beam of light along an axis substantially perpendicular to said annular axis of said bleed ring.

7. The sealed observation element of claim 6 further comprising a second sight glass positioned between the light source and the pipe cross.

8. A sealed observation element for viewing the flow of a molten liquid sulfur through a sulfur transfer line comprising:
 a sight glass having an interior and an exterior surface;
 a bleed ring positioned adjacent to the interior surface of the sight glass;
 the bleed ring defining an annular axis and a plane perpendicular to the annular axis said bleed ring further comprising a pair of opposed purge passageways for the flow of a heated purge medium, said purge passageways having opposed internal openings, said opposed internal openings defining a diameter of said bleed ring, said purge passageways being angled at about 30° relative to said plane and at an angle of about 30° relative to said diameter to direct the flow of the purge medium toward the internal surface of the sight glass; and
 a supply of heated purge medium flowing through the purge passageways at a flow rate and a temperature sufficient to prevent the deposition of sulfur on the interior surface of the sight glass.

9. The sealed observation element of claim 8 further comprising a source of heated purge medium and a connector for connecting the source of purge medium to the purge passageways.

10. The sealed observation element of claim 8 further comprising a steam jacketed pipe for mounting said sight glass and bleed ring.

11. The sealed observation element of claim 8 further comprising a pipe cross for mounting the sealed observation element in a sulfur transfer line.

12. The sealed observation element of claim 11 further comprising
 a weir for directing the flow of the molten sulfur toward the center of the pipe cross; and
 a light source for illuminating the molten sulfur flowing through the sulfur transfer line, the light source projecting a beam of light along an axis substantially perpendicular to said annular axis of said bleed ring.

13. The sealed observation element of claim 12 further comprising a second sight glass positioned between the light source and the pipe cross.

14. A sealed observation element for viewing the flow of a molten liquid sulfur through a sulfur transfer line comprising:
 first and second sight glasses; and
 means positioned between said first sight glass and said second sight glass for at least partially defining an internal space between said first and second sight glasses and at least one passageway for the introduction into the observation element of means for heating the internal space between said first and second sight glasses;
 wherein said heating means is sufficient to deter sulfur condensation on an interior surface of said first sight glass.

15. The sealed observation element of claim 14 wherein said heating means comprises a heated gas.

16. The sealed observation element of claim 14 wherein said heating means comprises an electric heating element.

17. The sealed observation element of claim 14 further comprising a steam jacketed pipe for mounting said sight glasses and bleed ring.

18. The sealed observation element of claim 14 further comprising a pipe cross for mounting said sight glasses and bleed ring.

19. The sealed observation element of claim 18 further comprising
 a weir for directing the flow of the molten sulfur toward the center of the pipe cross; and
 a light source for illuminating flowing molten sulfur.

20. The sealed observation element of claim 19 wherein the light source projects a beam of light along an axis substantially perpendicular to said annular axis.

21. A sealed observation element for viewing the flow of molten liquid sulfur through a sulfur transfer line comprising:
 first and second sight glasses;
 a bleed ring positioned between said first and second sight glasses, said bleed ring having an annular axis and defining an internal space between said first and second sight glasses, said bleed ring further defining at least one passageway for the introduction of a heated gas into the internal space;
 a pipe cross for mounting said sight glasses and bleed ring in a sulfur transfer line;
 a weir for directing the sulfur toward the center of the pipe cross for observation through said first and second sight glasses; and
 a light source for illuminating flowing molten sulfur flowing over said weir, said light source projecting a beam of light along an axis substantially perpendicular to said annular axis.

22. The sealed observation element of claim 21, further comprising means for heating said internal space.

23. The sealed observation element of claim 21, further comprising a second bleed ring positioned between an interior surface of said first sight glass and said pipe cross.

24. A sealed observation element for viewing the flow of a liquid material comprising:
 a sight glass having an interior and an exterior surface;
 a bleed ring positioned adjacent to the interior surface of the sight glass, said bleed ring having an annular axis and defining a pair of opposed purge passageways for the flow of a heated purge medium, wherein each purge passageway has an internal opening and is angled to direct the flow of the heated purge medium towards the interior surface of said sight glass;

a pipe cross on which said bleed ring is mounted;

a weir for directing the liquid material toward the center of the pipe cross for observation through said sight glass; and a light source for illuminating the flowing liquid material.

25. A sealed observation element for viewing the flow of a liquid material comprising:

a sight glass having an interior and an exterior surface;

a bleed ring positioned adjacent to the interior surface of the sight glass, said bleed ring having an annular axis and defining a pair of opposed purge passageways for the flow of a heated purge medium, wherein each purge passageway is angled to direct the flow of the heated purge medium towards the interior surface of said sight glass;

a steam jacketed material transfer pipe on which said bleed ring is mounted;

a weir for directing the liquid material toward the center of the transfer pipe for observation through said sight glass; and a light source for illuminating the flowing liquid material.

26. A sealed observation element for viewing a flow of material comprising:

a first sight glass having an interior and an exterior surface;

a pipe on which the sight glass is mounted; and a weir positioned within the pipe to direct the flow of material toward the interior surface of the sight glass.

27. The sealed observation element of claim 26, wherein the pipe is a steam jacketed pipe.

28. The sealed observation element of claim 26, further comprising a light source for illuminating the flow of material through the pipe.

29. The sealed observation element of claim 26, further comprising means for deterring the condensation of material on the interior surface of the sight glass.

30. The sealed observation element of claim 26, further comprising a second sight glass positioned between the first sight glass and the pipe.

31. A sealed observation element for viewing a flow of material comprising:

a first sight glass having an interior and an exterior surface;

a pipe cross on which the first sight glass is mounted; and a weir positioned within the pipe cross to direct the flow of material toward the center of the pipe cross.

32. The sealed observation element of claim 31, wherein the pipe cross is steam jacketed.

33. The sealed observation element of claim 31, further comprising a light source for illuminating the flow of material through the pipe cross.

34. The sealed observation element of claim 31, further comprising a second sight glass positioned between the first sight glass and the pipe cross.

35. The sealed observation element of claim 31, further comprising means for deterring the condensation of material on the interior surface of the second sight glass.

* * * * *